April 22, 1924.                                                    1,491,065
C. J. RANDALL
METHOD AND TOOL FOR LAP SEAMING RUBBER GOODS
Filed Oct. 28, 1919
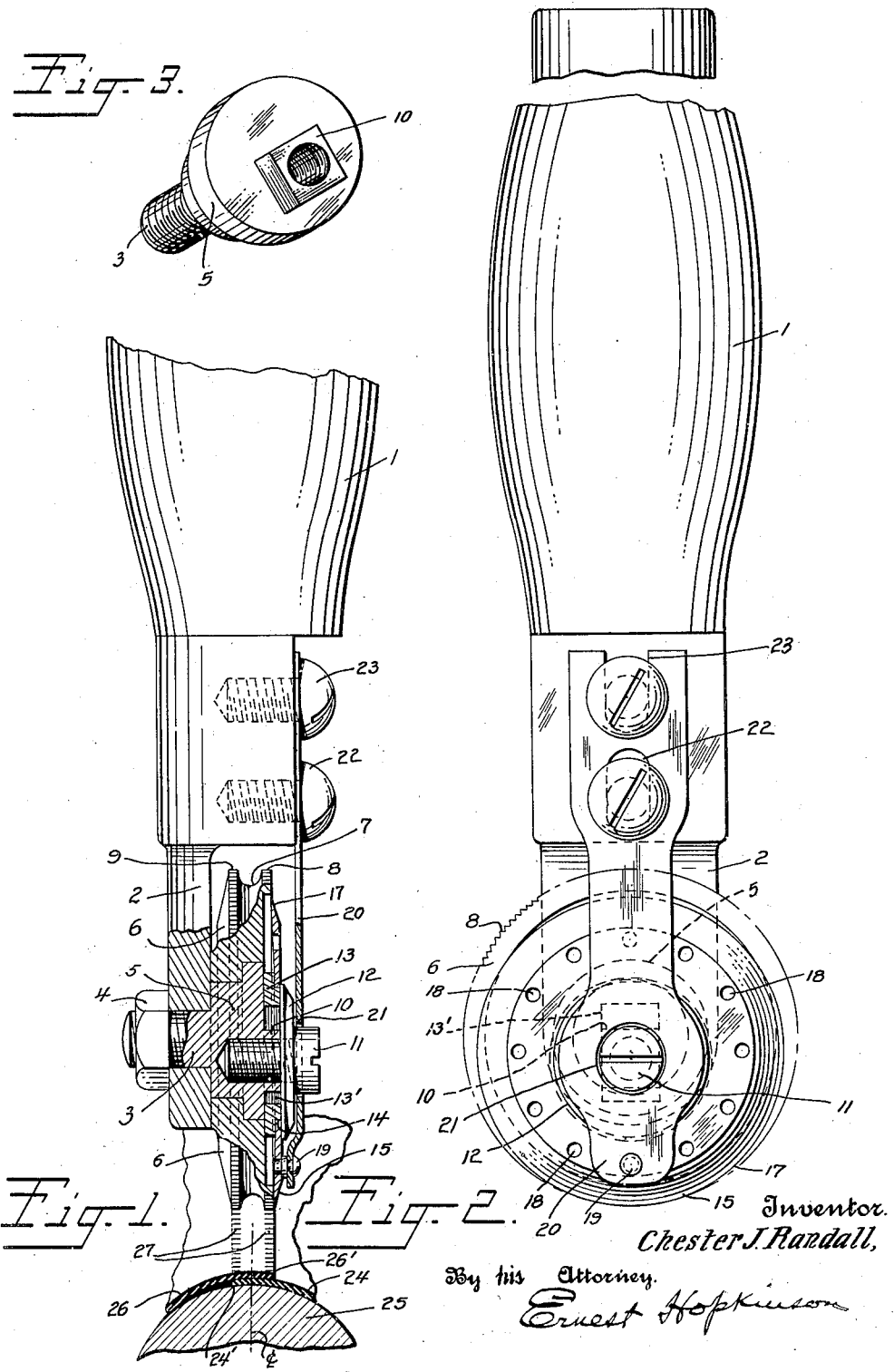

Patented Apr. 22, 1924.

1,491,065

UNITED STATES PATENT OFFICE.

CHESTER J. RANDALL, OF NAUGATUCK, CONNECTICUT, ASSIGNOR TO THE GOODYEAR'S METALLIC RUBBER SHOE COMPANY, A CORPORATION OF CONNECTICUT.

METHOD AND TOOL FOR LAP-SEAMING RUBBER GOODS.

Application filed October 28, 1919. Serial No. 333,920.

*To all whom it may concern:*

Be it known that I, CHESTER J. RANDALL, a citizen of the United States, residing at Naugatuck, county of New Haven, and State of Connecticut, have invented certain new and useful Improvements in Methods and Tools for Lap-Seaming Rubber Goods, of which the following is a full, clear, and exact description.

This invention relates to a method and tool for securing together or seaming adhesive goods such as rubber and rubberized fabrics, and is especially related to the manufacture of such footwear as rubbers and boots.

In the manufacture of rubbers, for instance, it has been customary to close the back or heel seam in four separate operations, to wit:—(1) cutting the free edge of one section, (2) superimposing the other section and cutting its free edge so as to make a lap joint of uniform length, (3) running a single stitcher or roller along the edge of the overlying section and (4) running a single stitcher or roller over the outlying section along a line immediately over the invisible edge of the underlying section. These four operations require no inconsiderable amount of time, the cutting especially requiring a certain knack or aptitude necessitating the use of a very sharp knife whose edge must constantly be kept keen.

The present invention aims to improve the method of closing the back or heel seam by reducing the number of operations required to close it and to this end preferably includes but two steps, to wit:—(1) a cutting of the underlying section just beyond the center line of the heel and (2) a cutting of the outer section and double stitching or pressing together of the sections along their parallel edges both preferably in one operation. Instead, however, of closing the back or heel seam in two operations it might be done in three operations, for instance, the underlying section might have its edge cut first, then the overlying section might have its edge cut and the immediately adjacent portion "stitched," and finally in a separate operation the invisible edge of the underlying section might be "stitched" to the overlying outer section. The back seam may also be closed in three operations by separately cutting the sections to form the edges of the lap seam and subsequently the double stitching of the sections together along the lines of their edges.

The invention also contemplates a new and improved tool for practicing the method above mentioned, facilitating rapid production, and requiring less concentration or attention to cut the sections, the cutting operation being especially exacting because of the danger of the knife penetrating through into the underlying section or materials. The tool of the present invention gauges the depth of the cut and absolutely insures against spoilation of goods by a careless or inexperienced operative.

The tool comprises a double-edged roller, in the parlance of the art known as a "double-stitcher," preferably in combination with a knife having at least one portion of its cutting edge adjacent to the periphery of the roller. The knife may be, and preferably is, adjustable in two directions, radially of the roller for gauging the depth of cut and substantially tangentially of the roller so as to enable the operator to hold the tool at a convenient slant when effecting a cut of the maximum depth permitted by the gauging roller. Means are also provided for quickly replacing a dull portion of the cutting edge by an unused sharp portion, this latter when the knife has an endless and preferably circular cutting edge.

These are some of the objects of my invention and other objects thereof will appear in the following description of the accompanying drawings illustrating a preferred embodiment of the invention.

In the drawings:

Fig. 1 is a side elevation partly in section of the tool in working relation to a last and lapping sections of footwear thereon, the sections being stitched and cut in one operation.

Fig. 2 is an elevation of the tool looking in a direction at right angles to Fig. 1.

Fig. 3 illustrates in perspective a stud screw on which the roller and knife are supported.

The tool comprises a handle 1 of any suitable materials having a shank 2, preferably at one side of the axis of the handle, and to the shank a stud screw 3 is clamped by a nut 4. The stud screw has a headed portion 5 revolubly supporting a roller 6 grooved peripherally as indicated at 7 to form stitching portions 8 and 9 which are spaced to suit the width of the lap seam. The portions 8 and 9 are preferably roughened or milled to indent the goods and to intimately press or unite them together in order to form a water-tight seam.

Eccentrically of the stud screw 3 is a projection in the form of a block 10 threaded to receive a clamp screw 11 beneath the head of which are washers 12 and 13 the latter of which is slotted as indicated at 13' to embrace the block 10 and is provided with a circular seat 14 for a knife 15. The knife 15 has an endless and preferably circular cutting edge 17 but the cutting edge may be shaped in any suitable manner it being essential only that a portion of the cutting edge be located contiguous the periphery of the roller 6 which acts to gauge or limit the depth of cut.

The knife and roller may be adjusted relatively to vary the depth of cut and to shift the point of contiguity or tangency of the effective portion of the cutting edge of the knife and the roller. This last mentioned adjustment is to accommodate the tool for use at different slants, it being understood that different operators hold the tool at different angles in performing cutting and pressing operations. In the embodiment of the invention illustrated radial displacement of slotted washer 13 varies the depth of cut. To give the tool the proper slant to suit the user the stud screw 3 is turned to shift the block 10 angularly relative to the longitudinal axis of the handle. When the knife is made with an endless and circular cutting edge it may be conveniently adjusted about its circular seat 14 on washer 13 to present an unused sharp edge portion by loosening the clamp screw 11, as will be obvious. Holes 18 are provided at suitable intervals in the knife 15 to receive a detent pin 19 which is yieldingly engaged with the holes to prevent displacement of the knife in any of its adjusted positions. The detent pin 19 is supported at the free end of a spring 20 provided with an aperture 21 to clear the screw 11 and also provided with slot and screw connections 22 and 23 with the handle 1 for adjustment.

At that stage in the manufacture of an overshoe, by way of example, when the back seam is to be closed, the operator brings one side 24 of the outer vamp portion around over the heel portion 25 of the last and sticks it to the previously formed body. This under section is then trimmed off as indicated at 24' to one side of the center line of the heel last. The other side 26 of the vamp is then superimposed over the first-mentioned portion and trimmed off as indicated at 26' to the opposite side of the center line of the last. In the cutting of the outer section 26 the roller 6 acts not only to gauge the depth of cut and prevent slicing into the under layer 24 but also as well through its roughened or milled portions 8 and 9 to simultaneously stitch the superimposed sections together as indicated at 27. Thus the present invention contemplates the closing of the heel seam in two operations, the edge 24' of the under layer being cut in one operation, and the edge 26' being cut and the stitches 27 being made in a second operation.

It is to be noted that the last and the shoe parts are imperfectly shown in Fig. 1 of the drawing, the parts beneath the outer vamp for instance being entirely omitted so as to make the illustration more clear, it being thought that the omission of the underlying materials does not impair the sufficiency of the disclosure which is concerned only with the operation of the tool on the vamp sections supported by the last.

While the above is the preferred method of procedure, some of the advantages of the invention would be realized in a three step method of closing the heel seam. This might be done in two ways, by using the knife in combination with a single stitcher i. e. one having a single roughened periphery 8 or 9 or by using an old cutting knife to cut the respective edges of the lapping sections and a double stitcher i. e. a roller having two spaced roughened portions 8 and 9.

The illustrated construction of tool is exceedingly simple to operate, insures against spoilation of the goods, and requires no especial dexterity to manipulate. It produces indentations which are uniformly spaced apart and are precisely parallel to the visible cut edge of the outlying section of the vamp at the back seam. In the case of rubbers where the heel seam is about one-eighth of an inch wide the exact parallelism of the stitching indentations enhances the appearance of the article.

While the tool is preferably constructed as above described in detail, it is capable of considerable modification. The roller and knife for instance might obviously be supported in axial alignment and the adjustment for slant or angularity dispensed with. And while the endless cutting edge 17 is preferably circular it might be made elliptical or disposed eccentrically of its supporting member. These and other changes might be made in the construction of the tool and therefore it is to be understood that the invention is not limited excepting as defined by the following claims to which reference should be had for a complete understanding of the scope of the invention.

Having thus described my invention, what I claim as new and desire to protect by Letters Patent is:

1. A lap seaming tool for adhesive goods comprising in combination a roller and knife having an endless cutting edge one portion of which at least is adjacent the periphery of the roller, and means permitting relative adjustment of the knife and roller to vary the working position of the roller and adjacent cutting edge of the knife.

2. A lap seaming tool for adhesive goods comprising in combination, a roller and knife having a circular cutting edge at least one portion of which is adjacent the periphery of the roller, means for supporting said roller and knife axially, said last named means permitting adjustment of the knife about its own axis whereby a dull cutting edge may be readily replaced by an unused sharp edge.

3. In a a hand tool for lap seam adhesive goods in combination a stitching roller, a circular knife, means supporting the knife eccentrically of the roller with at least one portion of its cutting edge in proximity to the periphery of the roller, and means permitting adjustment of the knife about its own axis to utilize different portions of its cutting edge.

4. A lap seaming tool for adhesive goods comprising in combination, a handle, a stitching roller revolubly supported by said handle, and a knife also supported by said handle with at least one portion of its cutting edge in substantially tangential relation to said stitching roller.

5. In a hand tool for lap seaming adhesive goods, in combination, a stitching roller, a knife having a cutting edge adjacent the periphery of the roller, and means for relatively adjusting the roller and knife in a direction transverse the cutting edge of the latter whereby the depth of cut may be gauged by the roller.

6. In a hand tool for lap seaming adhesive goods in combination, a stitching roller, a knife having a cutting edge adjacent the periphery of the roller, and means for adjusting the knife in a direction transverse its cutting edge and relative to the stitching roller to gauge the depth of cut.

7. In a hand tool for lap seaming adhesive goods, in combination, a stitching roller, a member revolubly supporting said roller, a knife having a cutting edge supported by said member in cooperating working relation with and adjacent the periphery of the stitching roller, and means permitting relative adjustment of the knife and stitching roller in a direction transverse the radius of the roller to the point where the knife edge is adjacent its periphery whereby the tool may be held at a slant suiting the user.

8. In a hand tool for lap seaming adhesive goods, in combination, a stitching roller, a knife having a cutting edge adjacent the periphery of the roller, and means for relatively adjusting the knife and stitching roller in directions transverse and substantially parallel with the cutting edge of the knife.

9. In a hand tool for lap seaming adhesive goods, in combination, a peripherally roughened stitching roller, a knife, a stud on which the roller is mounted and which also supports the knife, means permitting adjustment of the knife substantially radially and angularly of the axis of the roller.

10. In a hand tool for lap seaming adhesive goods, in combination, a stitching roller, a knife having an endless cutting edge, means supporting said roller and knife with a portion of its cutting edge in substantially tangential relation to the periphery of the roller and permitting adjustment of the knife to locate different portions of the endless cutting edge in tangential relation to the roller.

11. In a hand tool for lap seaming adhesive goods, in combination, a corrugated stitching roller, a circular knife, means revolubly supporting the roller and sustaining the knife eccentrically of the roller with portions of their periphery in proximity, means permitting angular adjustment of the knife about its own axis, and means for holding the knife in any adjusted position.

12. In the manufacture of rubber goods, the method of closing a seam which includes trimming an edge of one section, subsequently lapping another section thereover, trimming the last named section to complete a lap joint, and stitching both sections together in one operation along spaced parallel lines immediately adjacent the cut edges of the lapping sections.

13. In the manufacture of rubber goods, the method of closing a seam which includes trimming an edge of one section, superimposing another section thereover, trimming its edge parallel to the previously cut edge of the first named section and simultaneously stitching the latter edge down immediately adjacent one of the cut edges, and subsequently stitching the other of the cut edges to the section lapping it.

14. In the manufacture of rubber footwear, the method of closing the back or heel seam which includes trimming an edge of one section parallel but beyond the center line of the heel, lapping the second section over the first, and subsequently in one operation cutting the second mentioned section to form a lap seam of substantially uniform width and stitching the sections together along spaced lines immediately adjacent the two cut edges of the sections.

15. In the manufacture of rubber goods the method of forming a seam which includes uniting a layer of unvulcanized rubber with another layer to form a lap joint, then pressing the two edges together and simultaneously trimming the edge of the upper layer and thereafter vulcanizing.

Signed at Naugatuck, county of New Haven, and State of Connecticut, this 21st day of October, 1919.

CHESTER J. RANDALL.